(12) United States Patent
Gupta et al.

(10) Patent No.: US 10,671,471 B2
(45) Date of Patent: Jun. 2, 2020

(54) TOPOLOGY-BASED FEATURE SELECTION FOR ANOMALY DETECTION

(71) Applicant: CA, Inc., New York, NY (US)

(72) Inventors: Smrati Gupta, San Jose, CA (US); Erhan Giral, Saratoga, CA (US)

(73) Assignee: CA, Inc., New York, NY (US)

( * ) Notice: Subject to any disclaimer, the term of this patent is extended or adjusted under 35 U.S.C. 154(b) by 88 days.

(21) Appl. No.: 15/894,647

(22) Filed: Feb. 12, 2018

(65) Prior Publication Data

US 2019/0250970 A1 Aug. 15, 2019

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01); *G06F 11/0709* (2013.01); *G06F 11/0772* (2013.01)

(58) Field of Classification Search
CPC .. G06F 11/079; G06F 11/0709; G06F 11/076; G06F 11/0772
See application file for complete search history.

(56) References Cited

U.S. PATENT DOCUMENTS

| | | | | |
|---|---|---|---|---|
| 2005/0097510 | A1* | 5/2005 | Manuel | G06F 9/4411 717/108 |
| 2018/0082516 | A1* | 3/2018 | Kubajak | G07F 17/3213 |
| 2018/0121822 | A1* | 5/2018 | Aghasaryan | G06N 7/005 |
| 2019/0163550 | A1* | 5/2019 | Harutyunyan | G06F 11/079 |

OTHER PUBLICATIONS

Heger, et al., "Application Performance Management: State of the Art and Challenges for the Future", Proceedings of the 8th ACM/SPEC on International Conference on Performance Engineering (ICPE '17), pp. 429-432, L'Aquila, Italy, Apr. 22-26, 2017.
Huberty, et al., "Multivariate Analysis of Variance and Covariance", In H. E. A. Tinsley & S. Brown (Eds.), Handbook of Applied Multivariate Statistics and Mathematical Modeling. (pp. 183-208) San Diego, CA: Academic Press., 2000.
Vargason, et al., "On the Use of Multivariate Methods for Analysis of Data from Biological Networks", Processes 2017, 5, 36., 11 pages.
Veasey, et al., "Anomaly Detection in Application Performance Monitoring Data", International Journal of Machine Learning and Computing 4(2), 7 pages, 2014.

* cited by examiner

*Primary Examiner* — Bryce P Bonzo
*Assistant Examiner* — Katherine Lin
(74) *Attorney, Agent, or Firm* — Foley & Lardner LLP

(57) ABSTRACT

Instead of attempting to scan all metric measurements of a distributed application, an anomaly detector intelligently selects instances of metrics from the universe of metric instances available for the distributed application to detect anomalies. Intelligent feature selection allows the anomaly detector to efficiently and reliably detect anomalies for a distributed application. The intelligent selection is guided by execution paths of transactions of the distributed application, and the execution paths are determined from a topology of the distributed application. The anomaly detector scans the incoming time-series data of the selected metric instances by transaction type and determines whether the scanned measurements across the selected metric instances form a pattern correlated with anomalous behavior.

18 Claims, 7 Drawing Sheets

TOPOLOGY-BASED FEATURE SELECTION FOR ANOMALY DETECTION

BACKGROUND

The disclosure generally relates to the field of data processing, and more particularly to software development, installation, and management.

Generally, a distributed application is an application that includes software components that are distributed across multiple networked host machines which may be physical machines or virtual machines. The distributed application presents an interface(s) to a client for requesting a transaction to be performed. Performing the transaction includes performing multiple operations or tasks, or "end-to-end" tasks of the transaction. Each component of the distributed software application handles a different subset of those tasks. This application architecture allows for a more flexible and scalable application compared with a monolithic application.

Large-scale distributed applications have a variety of components including web services and/or microservices. A distributed tracing tool can be used to trace an execution path through these various components. As the software components are executed (e.g., remote procedure calls, remote invocation calls, application programming interface (API) function invocations, etc.), identification of the component is recorded, and the sequence of calls/invocations are correlated to present the execution path.

BRIEF DESCRIPTION OF THE DRAWINGS

Embodiments of the disclosure may be better understood by referencing the accompanying drawings.

DESCRIPTION

Figure 1:
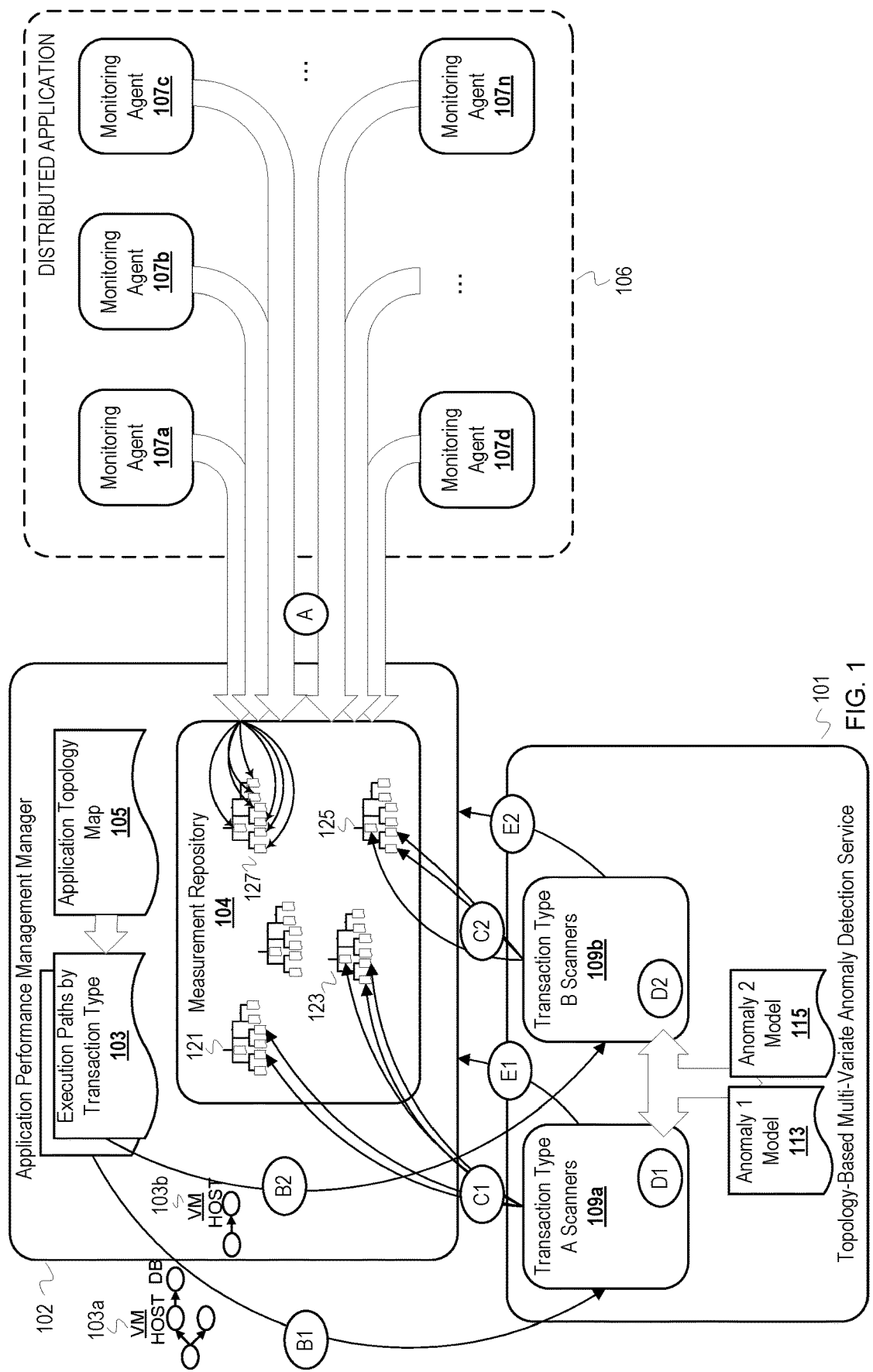
FIG. 1 is a diagram of a topology-based multi-variate anomaly detection service that intelligently selects features by transaction type to detect anomalies.

The description that follows includes example systems, methods, techniques, and program flows that embody the disclosure. However, it is understood that this disclosure may be practiced without these specific details. For instance, the description refers to a service (e.g., APM manager and anomaly detection service), but the described functionality can be embodied as tools or applications that are not necessarily services. In other instances, well-known instruction instances, protocols, structures and techniques have not been shown in detail in order not to obfuscate the description.

Overview

A large-scale distributed application can include numerous software components distributed across an infrastructure comprised of numerous machines (e.g., servers, storage arrays, routers, etc.). The distributed application provides different transactions to clients (e.g., customer check-in, purchasing, etc.) that variously traverse the application components and the infrastructure layer (e.g., routers, storage arrays, etc.) that supports them. Monitoring agents are deployed throughout the components of the layers of a distributed application (e.g., an infrastructure layer and an application layer). The monitoring agents determine measurements for application related metrics and report them to an application performance management manager ("APM manager"). An "application related metric" refers to a measurable attribute of a component(s) of an application, examples of which include available memory, number of active sessions, throughput, latency, average response time, responses per interval, stall counts, and errors per interval. The APM manager detects events that impact application performance. An event may be directly based on an application related metric or derived from one or more application related metrics. An event can be generated from the distributed application (e.g., component restart event) or can be generated based on a measurement(s) or value computed from measurements (e.g., an average of measurements). For instance, an event may be an indication that average response time of a component or for a transaction exceeds a defined threshold. This comparison of a measurement against a threshold is typically how events are detected. The APM manager analyzes those events to diagnose the cause of the events and determine a corrective action.

A topology-based anomaly detection service ("anomaly detector") can generate an event for consumption by the APM manager that is an anomaly detection event based on multiple application related metrics. The anomaly detection event indicates that the anomaly detector detected either a known (i.e., named) anomaly or unknown/unnamed anomaly. The detected anomaly is behavior of a set of metrics that is not similar to their canonical behavior and likely impacts performance of the application. The anomaly detector time slices time-series data (i.e., measurements of application related metrics) collected and/or generated from monitoring agents, and then performs multivariate analysis on each time-series data slice ("metric data slice"). The anomaly detector analyzes the variation among multiple metrics represented in a metric data slice to detect anomalous behavior as represented by a trend among the multiple metrics ("pattern") in the metric data slice.

While a pattern can be formed from a metric data slice for a single metric, this pattern would not be significantly more informative than the non-anomaly detection events already generated. However, reading and analyzing (collectively "scanning") all measurements of all metrics monitored is not feasible. Monitoring agents of a distributed application may be monitoring thousands of instances of metrics (e.g., 30 categories of metrics across hundreds of components) resulting in the generation of half a million measurements per hour, assuming a sampling rate of 60 seconds. In addition to the measurements collected at the sampling rate, other measurements are passively collected (e.g., injected measurement logic). Searching a 1000-dimensional space for a pattern is not only computationally challenging but would result in pattern detections that could not be useful either due to the volume of patterns detected or the amount of noise in the detected patterns.

Instead of attempting to scan all metric measurements, the anomaly detector intelligently selects instances of metrics from the universe of metric instances available for a distributed application to detect anomalies. Intelligently selecting metric instances to investigate (also referred to as feature selection) allows the anomaly detector to efficiently and reliably detect anomalies for a distributed application. The intelligent selection is guided by execution paths of transactions of the distributed application, and the execution paths are determined from a topology of the distributed application ("application topology"). The anomaly detector scans the incoming time-series data of the selected metric instances by transaction type and determines whether the scanned measurements across the selected metric instances form a pattern correlated with anomalous behavior.

Example Illustrations

FIG. 1 is a diagram of a topology-based multi-variate anomaly detection service that intelligently selects features by transaction type to detect anomalies. FIG. 1 depicts monitoring agents 107a-107n deployed across components of a distributed application 106. The monitoring agents 107a-107n communicate with an APM manager 102. The APM manager 102 creates and maintains an application topology map 105 for the distributed application 106. The APM manager 102 also creates and maintains traces or execution paths 103. Since the distributed application 106 is presumed to provide multiple types of transactions and each instance of a transaction type likely does not traverse a same execution path, FIG. 1 illustrates multiple execution paths for the presumed multiple transaction types. FIG. 1 also depicts an example architecture of a topology-based multi-variate anomaly detection service 101. The topology-based multi-variate anomaly detection service 101 scans for known anomalies based on anomaly models loaded into or accessible by the topology-based multi-variate anomaly detection service 101.

The anomaly models include a model 113 for an anomaly 1 and a model 115 for an anomaly 2. The known anomalies are typically named for human comprehension to facilitate efficient triage/troubleshooting. For instance, anomaly 1 may be "memory leak" and anomaly 2 may be "death by a thousand cuts." The models can be defined based on expert knowledge that identifies behavior of a set of metrics that correlate to a performance issue. An anomaly model describes this behavior or pattern formed by measurements of a specified set of metrics over time that correlates to the anomaly ("anomaly blame metrics") represented by the model. The anomaly blame metrics may be for a single component ("intra-component") or among multiple components ("cross-component"). An anomaly model for APM specifies a component type(s) (e.g., virtual machine, router, database) and the anomaly blame metrics of the specified component type(s). The anomaly model can describe the behavior of the anomaly blame metrics with different techniques. For instance, the anomaly model can "describe the behavior" with a covariance matrix generated from multi-variate analysis of covariance (MANCOVA) from previously evaluated measurements correlated with an anomaly (e.g., lab measurements and/or actual deployed product measurements). The covariance indicated by the covariance matrix represents the pattern of the anomaly blame metrics. As another example, an APM anomaly model can describe the behavior of the set of metrics with a set of conditions to evaluate the pattern formed by measurements of the blame metrics. The conditions can be based on directions of measurements, rate of change of measurements of a metric with respect to one or more other metric measurements, frequency of directional changes across metrics, and changes in measurements with respect to external factors (e.g., time of day). As another example, an anomaly model can include a set of functions that represent a pattern formed by measurements of blame metrics. Examples of the set of functions include an average, summation, and decompositions (e.g., decompose into a trend component, cyclical component, seasonal component, a noise component).

FIG. 1 includes stages A-E2 as example stages of operation to aid in illustrating operation of the topology-based multi-variate anomaly detection service 101. Each stage can correspond to one or multiple operations. The described example stages of operations should not be used to limit scope of the claims.

During a stage A, the monitoring agents 107a-107n communicate a vast number of metric measurements for the distributed application 106 to the APM manager. As previously indicated, the measurements can span a variety of types of metrics and different layers of the distributed application. These measurements are written into a measurement repository 104 of the APM manager 102. The monitoring agents 107a-107n and/or the APM manager 102 writes the measurements as time-series data (i.e., into data structures that reflect that collection of measurements over time). Measurements can be a transaction, underlying hardware components, individual software components, etc. This illustration focuses on the measurements per component. The measurement repository 104 is illustrated to represent organization of at least some measurements by component. Regardless of the specific implementation of the measurement repository 104, measurements can be accessed by component identifier. A component identifier may encode a host identifier and a specific component identifier (e.g., HOST1_VM).

When the topology-based multi-variate anomaly detection service 101 starts, the service 101 queries the APM manager 102 for the execution paths 103 of the distributed application 106. Before querying for the execution paths, the service 101 may query the APM manager 102 for the transaction types provided by the distributed application 106, if not already known (e.g., programmed/configured into the service 101). With the simple example of two transaction types, the service 101 at stage B1 determines an execution path 103a for a transaction type A and at stage B2 determines an execution path 103b for a transaction type B. Based on the execution paths, the service 101 instantiates scanners to scan the components of the execution paths for anomalies. The service 101 instantiates scanners 109a for the transaction type A and scanners 109b for the transaction type B. In this example architecture, the scanners 109a-109b are programmed to read slices of the time-series measurements from the measurement repository 104 and analyze the slices against the anomaly models 113, 115.

The service 101 determines components and metric instances in the execution paths relevant to each of the anomaly models, and then instantiates the scanners accordingly. For this illustration, anomaly 1 model 113 describes behavior of blame metrics of a virtual machine. The anomaly 2 model 115 describes the blame metrics of a database. The entries 121 (e.g., records, subtree nodes, etc.) of the measurement repository 104 include time-series measurements of metrics collected for a database instance of the distributed application 106 in the execution path 103a. The entries 123 include time-series measurements of metrics collected for a host in the execution path 103a and for a virtual machine on the host. The entries 123 include time-series measurements of metrics collected for a host in the execution path 103b and for a virtual machine on the host. The service 101 determines that the anomaly 1 model 113 indicates blame metrics of a virtual machine for the represented anomaly, and then identifies an instance of a virtual machine in the execution path 103a. The service 101 instantiates one of the scanners 109a to read the entries 123 that correspond to the blame metrics indicated in the anomaly 1 model 113 at stage C1 and analyze the measurements read from entries 123 at stage D1 to detect whether the measurements form a pattern indicated in the model 113. The service 101 also identifies the instance of the virtual machine in the execution path 103b as relevant to the model 113, and instantiates one of the scanners 109b to read the entries 125 that correspond to the blame metrics of the model 113 at stage C2. At stage D2, the instantiated scanner 109b determines whether measurements read from the entries 125 form the pattern indicated in the model 113. For the anomaly 2 model 115, the service 101 determines that that the model 115 indicates a database as a relevant type of component. The service 101 determines that the execution path 103b does not include a database instance and does not instantiate a corresponding scanner. The service 101 determines that the execution path 103a includes a database instance, which is a relevant component type for the model 115. The service 101 determines the blame metrics of anomaly 2 as indicated in the model 115 and instantiates one of the scanners 109a to read the blame metric measurements from the entries 121 for the database instance in the execution path 103a at stage C1. The service 101 also instantiates the scanner to determine whether measurements read from the entries 121 form a pattern indicated in the model 115 for anomaly 2 at stage D1.

If one of the scanners 109a, 109b detects a pattern corresponding to either of the anomalies represented by the models 113, 115, then the scanner generates an event for consumption by the APM manager 102. At stage E1, one of the scanners 109a determines that measurements read from the measurement repository 104 form a pattern indicated in one of the models 113, 115 and generate a corresponding event. The event indicates the anomaly name and corresponding component(s) of the distributed application 106. The event can also indicate the transaction type, and other information that can be used for triage of the named anomaly. At stage E2, the scanner 109b detects a pattern in measurements read from the entries 125 that satisfies the pattern indicated in the model 115. Due to the dynamic nature of applications, the service 101 intermittently or periodically refreshes the execution paths that inform the scanning. Over time, execution paths can change and different transaction types can become active/dormant. For example, certain types of transactions may not be performed during business hours. Thus, an APM manager may not have an execution path for an inactive or dormant transaction type.

The implementation illustrated in FIG. 1 is an example illustration. Embodiments can instantiate scanners differently according to available resources, policies, etc. For instance, a topology-based multi-variate anomaly detection service can divide the labor of identifying and reading blame metrics indicated in an anomaly model for relevant components from analyzing the measurements to detect an anomaly pattern. The topology-based multi-variate anomaly detection service can instantiate an analyzer per anomaly model and instantiate a reader per relevant component instance of available/active execution paths per anomaly model. For example, the detection service instantiates 4 readers when x execution paths include 4 different instances of a component relevant to an anomaly model. These 4 readers can read time sliced time-series measurements into data structure for analysis (e.g., matrices) and insert them into an input queue for the analyzer instantiated for the anomaly model. Embodiments can also program scanners to read in measurement slices and invoke analyzer program code with arguments that include an anomaly model identifier and the measurement slice.

Figure 2:
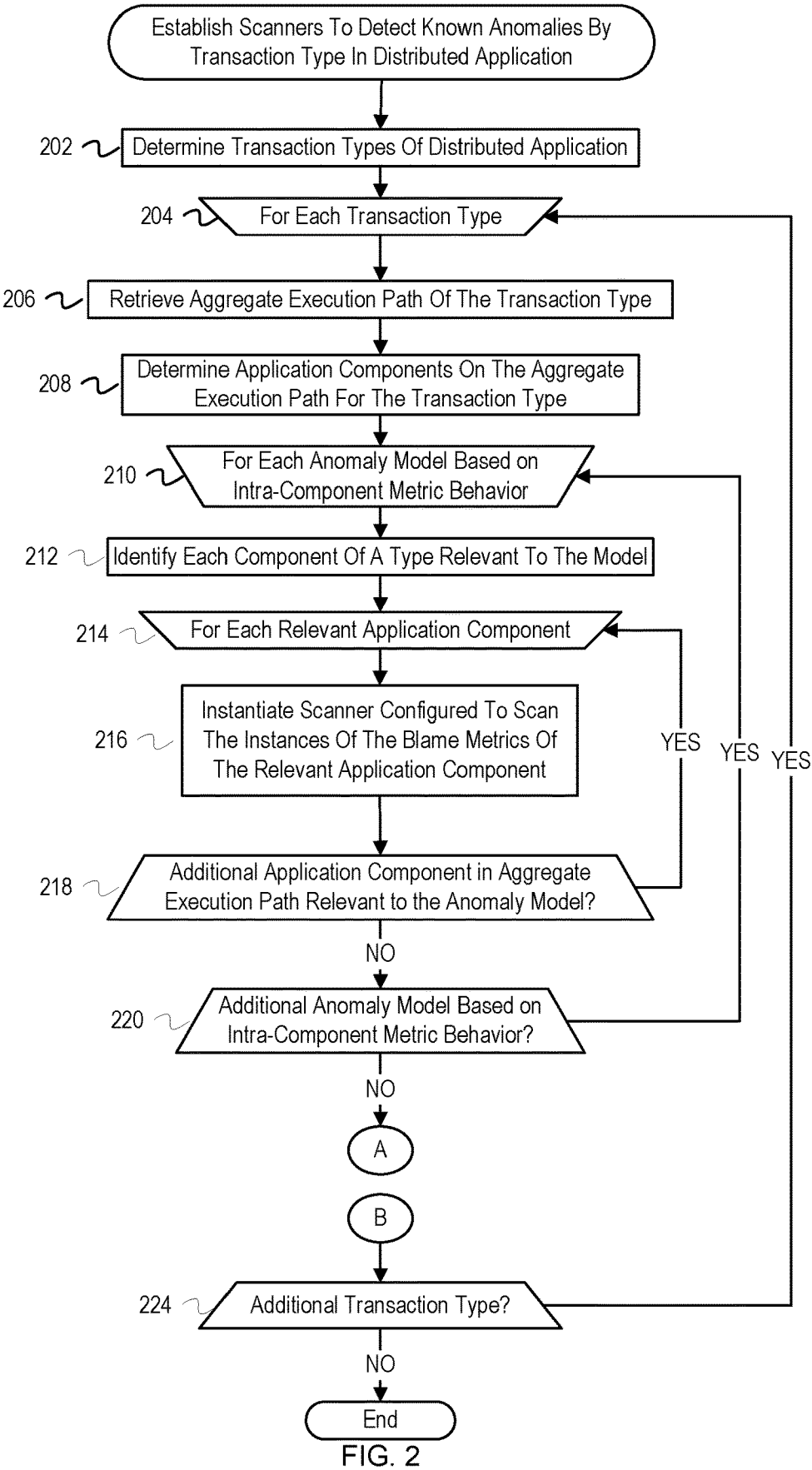
FIGS. 2-3 illustrate a flowchart of example operations for establishing scanners to detect known anomalies by transaction type in a distributed application.
Figure 3:
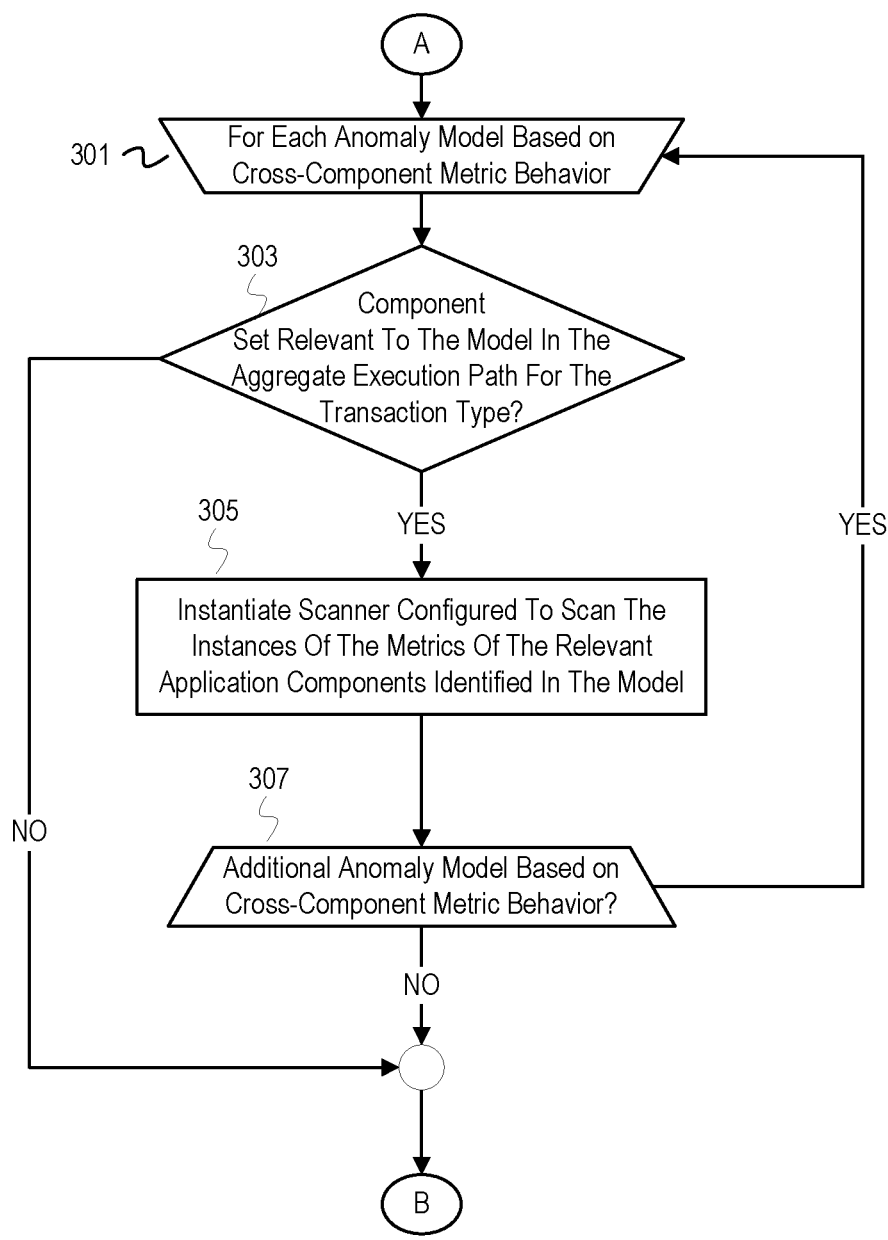

FIGS. 2-3 illustrate a flowchart of example operations for establishing scanners to detect known anomalies by transaction type in a distributed application. The description of FIGS. 2-3 refers to an anomaly detector as performing the operations. The anomaly detector for these example operations instantiates a scanner for each relevant component of each known anomaly model loaded into the anomaly detector for each transaction type execution path. The example operations of FIGS. 2-3 distinguish between an intra-component anomaly model and a cross-component anomaly model.

The anomaly detector initially determines transaction types of a distributed application associated with the anomaly detector (202). The anomaly detector may query an APM manager to determine transaction types if not already input to the anomaly detector. The anomaly detector determines the provided types of transactions based on an assumption that each transaction type will have a different execution path and/or that a detected anomaly should be associated with a transaction type.

For each determined transaction type (204), the anomaly detector gathers information to instantiate appropriate scanners for each known anomaly model relevant to the transaction type. The description refers to a transaction type in a current iteration as a current transaction type. The anomaly detector retrieves an aggregate execution path of the current transaction type (206). Each instance of the current transaction type can have some variation in execution path. Therefore, the execution paths of multiple instances of a same transaction type can be aggregated into a single execution path. The anomaly detector then determines application components on the aggregate execution path for the current transaction type (208). Each node in the execution path corresponds to a component of the distributed application and each component will be identified (e.g., network address, host name concatenated with component name, etc.). In addition to an identifier, the node in the execution path either indicates a type of the component or the component identifier can be used to determine component type.

For each anomaly model based on intra-component metric behavior (210), the anomaly detector determines relevant components to scan. The description refers to an intra-component anomaly model of a current iteration as a current intra-component anomaly model. The anomaly detector identifies each component in the execution path of the current transaction type that is relevant to the current intra-component anomaly model (212). Each component in the current transaction type execution path of a same type as that indicated in the current intra-component anomaly model is determined to be relevant. For each relevant component in the current transaction type execution path (214), the anomaly detector instantiates a scanner configured to scan the instances of the blame metrics of the relevant application component (216). The anomaly detector can invoke a subroutine that instantiates a process/thread to read time-series measurements of blame metrics identified in the current intra-component anomaly model. To "configure" the scanner, the anomaly detector can invoke the subroutine with arguments that include indications of the blame metrics and an identifier of the relevant component identifier. The scanner can be programmed with the protocol to access an APM measurement repository and use component identifier and indications of the blame metrics to access the measurements for detection of the known anomaly represented by the current intra-component anomaly model. The anomaly detector can also "configure" the analyzing aspect of the scanner by passing as arguments the anomaly model and a subroutine identifier for the particular analysis to be performed, if any. In some cases, the anomaly model embodies logic and/or conditions that collectively describe a pattern of blame metric measurements that correlate to the known anomaly. If an anomaly event should identify a transaction type, then an indication of the transaction type is associated with the scanner for propagation into a generated anomaly detection event. After instantiation of the configured scanner, the anomaly detector determines whether there is an additional application component in the aggregate execution path of the current transaction type that is relevant to the current intra-component anomaly model (218). If so, then the anomaly detector proceeds to instantiating the scanner for that relevant component. Otherwise, the anomaly detector determines whether there is an additional intra-component anomaly model to process (220). If there is not an additional intra-component anomaly model to process, the anomaly detector proceeds to any installed anomaly models based on cross-component metric behavior (FIG. 3). After processing cross-component anomaly models for the current transaction type, the anomaly detector proceeds to the next transaction type, if any (224).

FIG. 3 continues from FIG. 2 for any installed cross-component anomaly models. The operations in FIG. 3 are similar to those for intra-component anomaly models (210, 212, 214, 216, 220). For each anomaly model based on cross-component metric behavior (301), the anomaly detector determines relevant component sets to scan. The anomaly detector determines whether there is a set of components in the aggregate execution path of the current transaction type that is relevant to the cross-component anomaly model (303). In addition to relevancy based on component types, a cross-component anomaly model can indicate a degree of adjacency or connection for blame metrics among a set of components. A pattern of measurements of blame metrics across components in a cross-component anomaly model may be limited to occurring when those relevant components are adjacent to each other, for instance. If the execution path of the current transaction type includes the relevant component set (214), then the anomaly detector instantiates a scanner configured to scan the instances of the blame metrics of the relevant application components (305). After instantiation of the configured scanner, the anomaly detector determines whether there is an additional cross-component anomaly model to process (307). If there is not an additional cross-component anomaly model to process, the anomaly detector proceeds to a next transaction type (224).

Figure 4:
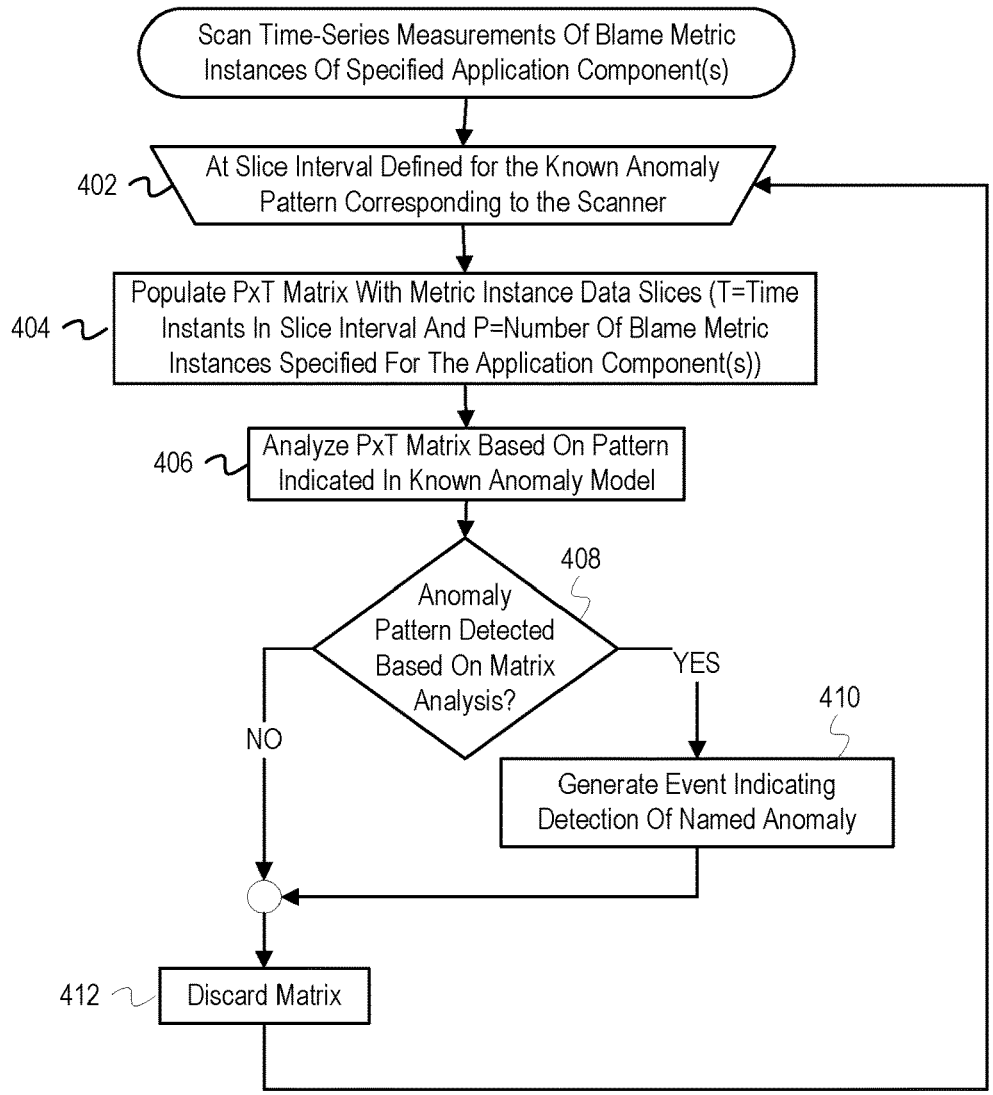
FIG. 4 is a flowchart of example operations for scanning time-series measurements of instances of blame metrics of a specific application component(s).

FIG. 4 is a flowchart of example operations for scanning time-series measurements of instances of blame metrics of a specific application component(s). The example operations of FIG. 4 represent the operations performed by instantiated scanners. The description of FIG. 4 refers to a scanner as performing the example operations. The example operations presume the scanner has been configured or instantiated with an identifier of an application component or identifiers of a set of application components and indications of the corresponding blame metrics. The example operations in FIG. 4 are written to apply to either blame metrics of an intra-component anomaly model or a cross-component anomaly model.

A scanner reads in time-series measurements of the specified blame metrics of the identified application component(s) at a slice interval defined for the pattern described in the known anomaly model for which the scanner was instantiated (402). The slice interval defines a number of observations or time instants of the blame metrics to collect for analysis. The scanner can buffer blame metrics measurements until the slice interval is satisfied and then populate a P×T matrix (P being the number of blame metrics and T being the number of time instants) with the buffered measurements or populate the matrix with the measurements as read in from the measurement repository (404). The scanner then analyzes the matrix based on the pattern indicated in the known anomaly model (406). The analysis depends upon how the pattern is indicated in the known anomaly model. If the pattern is described with logic that evaluates conditions (e.g., m1 and m2 increase at rate beyond rate change threshold while m3 decreases), then the analysis determines attributes of the blame metric measurements (rates of change, directional changes, flapping, etc.) and compares those attributes against the pattern attributes indicated in the logic/conditions of the known anomaly model. For a logic based model, the anomaly detector may normalize some or all of the blame metric measurements prior to evaluation since magnitude of those measurements may not be relevant to the analysis. If the pattern is indicated in the known anomaly model as a set of functions, then the scanner determines whether the measurements in the matrix fit the set of functions within a specified margin of variance.

Based on the analysis, the scanner determines whether an anomaly pattern has been detected (408). If so, then the scanner generates an event indicating detection of the named anomaly (410). As previously mentioned, the event can also indicate the component(s) and the transaction type. If an anomaly pattern was not detected, then the scanner discards the matrix (412) and proceeds to a next data slice. Embodiments may analyze a sliding window of blame metrics measurements instead of discrete slices. In that case, the scanner continuously updates the matrix or other data structure used to store the blame metrics measurements to insert the blame metrics measurements of a newest time instant and removes those of the oldest time instant.

Figure 5:
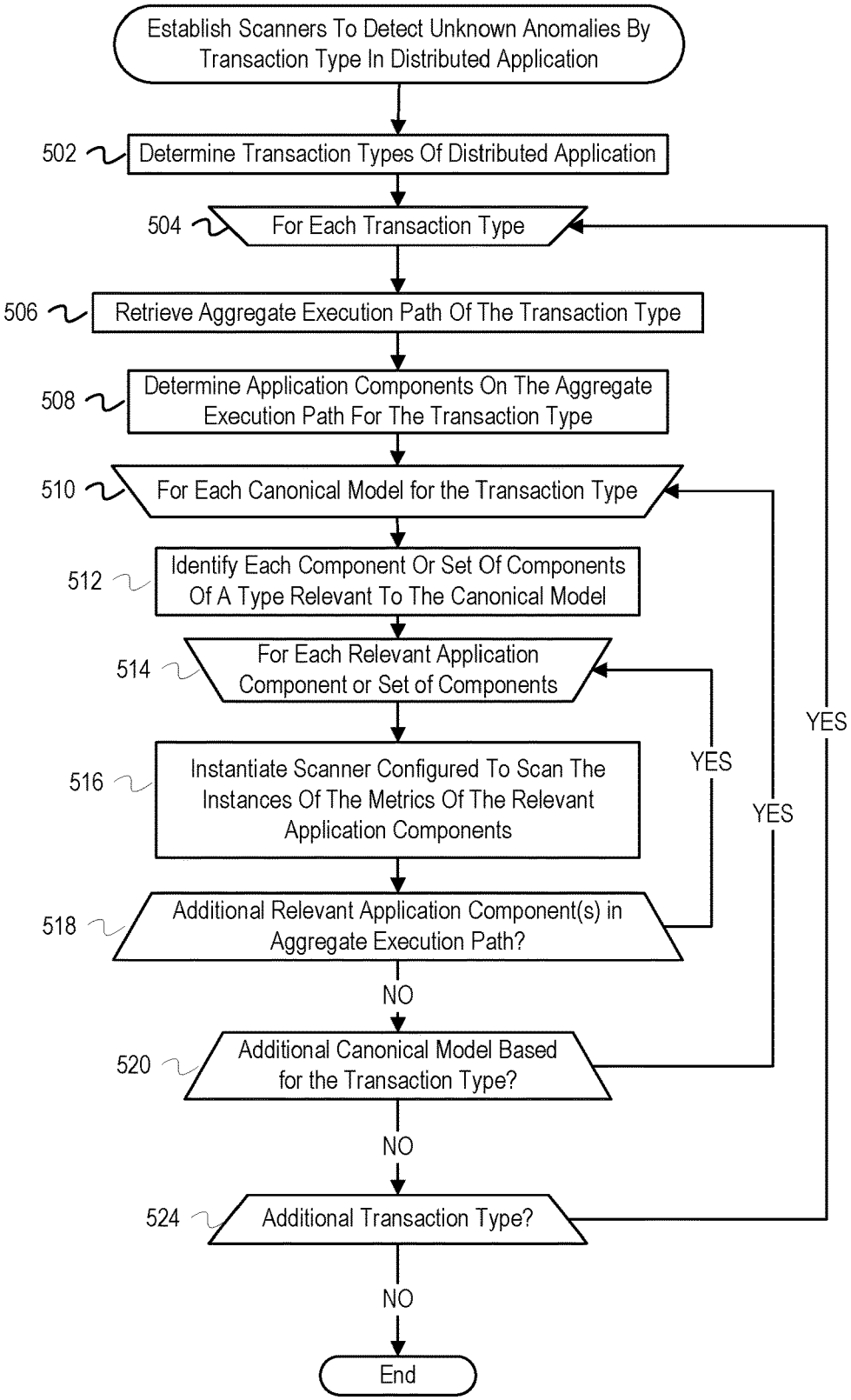
FIG. 5 is a flowchart of example operations for establishing scanners to detect unknown anomalies by transaction type in a distributed application.
Figure 6:
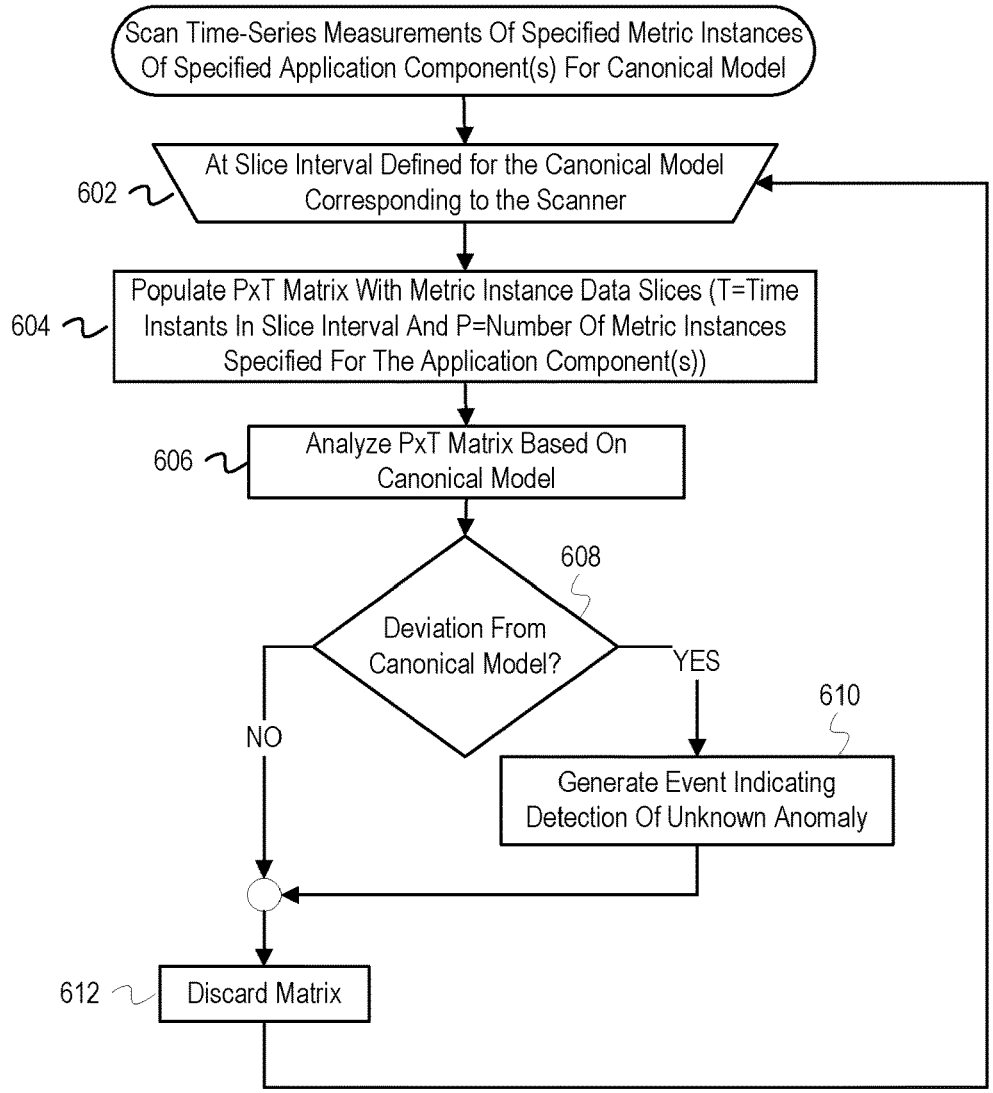
FIG. 6 is a flowchart of example operations for scanning time-series measurements of instances of metrics of a specific application component(s).

The preceding example illustrations have scanned for named anomalies represented by known anomaly models. Embodiments can also scan for unknown/unnamed anomalies by looking for patterns that vary beyond an acceptable margin from a canonical behavior of performance metrics. FIGS. 5-6 present flowcharts of example operations for scanning for unknown anomalies.

FIG. 5 is a flowchart of example operations for establishing scanners to detect unknown anomalies by transaction type in a distributed application. Although there are similar operations between FIG. 5 and FIG. 2, the example operations in FIG. 5 are analyzing specified metric measurements to detect a pattern of behavior that deviates from a canonical behavior that has been determined for a distributed application.

The anomaly detector determines transaction types of a distributed application associated with the anomaly detector (502). The anomaly detector may query an APM manager to determine transaction types if not already input to the anomaly detector. Since execution paths are dynamic, the anomaly detector can subscribe to receive changes or updated execution paths. Or the anomaly detector can periodically request active execution paths (i.e., execution paths of transactions that have occurred in a recent time window).

For each determined transaction type (504), the anomaly detector gathers information to instantiate appropriate scanners to determine deviation from canonical behavior as represented by one or more sets of metrics. The description refers to a transaction type in a current iteration as a current transaction type. The anomaly detector retrieves an aggregate execution path of the current transaction type (506). As previously mentioned, each instance of the current transaction type can have some variation in execution path. Therefore, the execution paths of multiple instances of a same transaction type can be aggregated into a single execution path. The anomaly detector then determines application components on the aggregate execution path for the current transaction type (508). The execution path includes and/or references information that identifies each component and at least indicates component type.

For each canonical model (510) for the transaction type, the anomaly detector determines relevant components to scan. Although FIG. 2 referred to intra-component anomaly models and cross-component anomaly models, each canonical model referred to in FIG. 5 can be based on behavior of multiple metrics of an individual component or across components. A canonical model can be per component or per transaction type. For instance, a canonical model can describe a pattern of metrics for a component for canonical behavior regardless of transaction type. A canonical model can describe a pattern of metrics for one or multiple components for canonical behavior of the distributed application for a particular transaction type or group of transaction types. The anomaly detector identifies each component in the execution path of the current transaction type that is relevant to the current canonical model (512). Each component in the current transaction type execution path of a same type as that indicated in the current canonical model is determined to be relevant.

For each relevant component in the current transaction type execution path (514), the anomaly detector instantiates a scanner configured to scan the instances of the metrics of the relevant application component (516). The anomaly detector can invoke a subroutine that instantiates a process/thread to read time-series measurements of metrics identified in the current canonical model. The anomaly detector can configure the scanner as previously described in FIG. 2. After instantiation of the configured scanner, the anomaly detector determines whether there is an additional application component in the aggregate execution path of the current transaction type that is relevant to the current canonical model (518). If so, then the anomaly detector proceeds to instantiating the scanner for that relevant component. Otherwise, the anomaly detector determines whether there is an additional canonical model to process (520). If there is not an additional canonical model to process, the anomaly detector proceeds to the next transaction type, if any (524).

FIG. 6 is a flowchart of example operations for scanning time-series measurements of instances of metrics of a specific application component(s). The example operations of FIG. 6 represent the operations performed by a scanner instantiated to determine deviation from a canonical model. The description of FIG. 6 refers to a scanner as performing the example operations. The example operations presume the scanner has been configured or instantiated with an identifier of an application component or identifiers of a set of application components and indications of the corresponding metrics specified in the canonical model(s) for the application components.

A scanner reads in time-series measurements of the specified metrics of the identified application component(s) at a slice interval defined for the pattern described in the canonical model for which the scanner was instantiated (602). The slice interval defines a number of observations or time instants of the metrics to collect for analysis. The scanner can populate a P×T matrix according to various techniques, such as those described with reference to FIG. 4 (604). The scanner then analyzes the matrix based on the pattern indicated in the canonical model (406). The analysis depends upon how the pattern is indicated in the canonical model. In contrast to FIG. 2, the scanner is analyzing to determine whether the slice of measurements exhibits behavior that deviates from behavior described in the canonical model. As with an anomaly model, the canonical model can describe canonical behavior differently. In one instance, a canonical model can describe canonical behavior with a set of criteria/conditions that are logically evaluated to determine deviation of measurements in a slice from canonical behavior. A canonical model can describe canonical behavior with a pattern correlated with canonical behavior. The pattern can be represented with a set of functions, values generated from MANCOVA, etc. The analysis of the matrix can include determining whether the slice measurements fit, within an acceptable margin, the set of functions; generating covariance analysis values and comparing against covariance analysis values of the canonical model; etc.

Based on the analysis, the scanner determines whether the slice measurements exhibit metric behavior that deviates from the canonical behavior expressed in the canonical model (608). If so, then the scanner generates an event indicating detection of an unknown or unnamed anomaly (610). As previously mentioned, the event can also indicate the component(s) and the transaction type. If an anomaly was not detected, then the scanner discards the matrix (612) and proceeds to a next data slice. Similar to the scanning based on anomaly models, embodiments may analyze a sliding window of metrics measurements instead of discrete slices.

Since the space of metrics that can be chosen for a canonical model is substantially larger than those identified for a named anomaly, the metrics chosen for a canonical model may be arbitrary to an extent (e.g., certain metrics may never express a behavior in aggregate that correlates to a meaningful event). The metrics chosen for a canonical model can be the top x metrics that most commonly occur in anomaly models. The metrics chosen for a canonical model may be those that are not in anomaly models for which scanners have been instantiated. A canonical model generator can be programmed that periodically rotates through different sets of metrics and generates a corresponding canonical model.

Variations

In the above example illustrations, models are defined based on knowledge of domain experts. These models can be revised or updated based on machine learning techniques. Models can be revised with supervised machine learning techniques that use a previously observed dataset(s), generated from a lab and/or from deployments, to revise anomaly and/or canonical models. For instance, normalization functions can be modified based on supervised machine learning to adapt to measurements actually observed in a deployment. The machine learning technique utilizes can also vary based on model type (e.g., logic based model that normalizes measurements versus a function based model that uses raw measurements). In addition, while a margin/threshold of variance can be a predefined amount (e.g., percentage) in general, per software component type, per hardware component type, etc., it can also be established or revised with a machine learning technique. A model, whether expressing a pattern as conditions and/or functions, can be trained with supervised machine learning that uses test data to establish an acceptable margin of variance. This margin of variance can be further refined/tailored by training the model with a dataset of a deployed, distributed application. Thus, the margin of variance can be static or dynamic.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that can communicate, propagate, or transport a program for use by or in connection with an instruction execution system, apparatus, or device, but is not a machine-readable storage medium.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
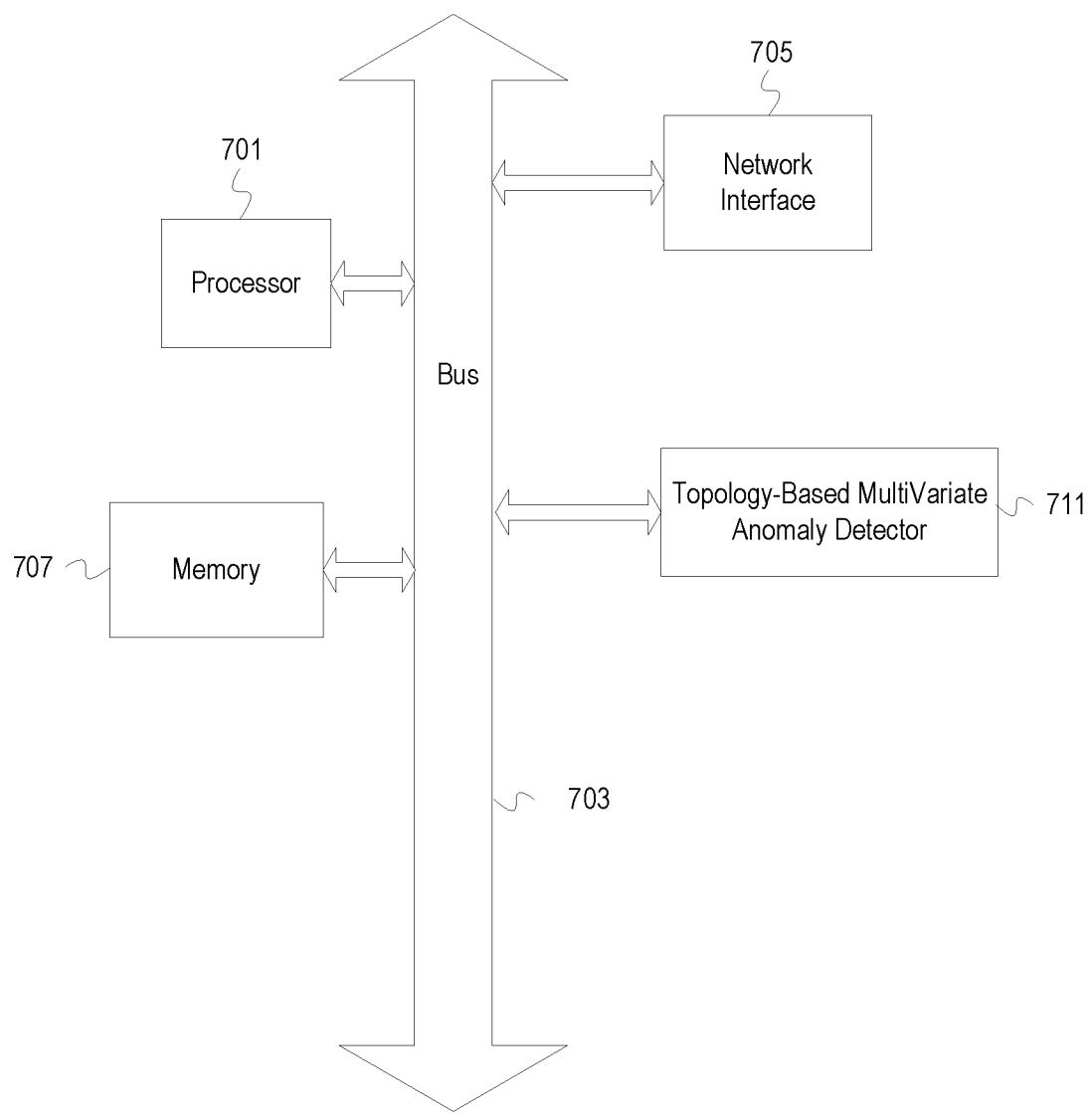
FIG. 7 depicts an example computer system with a transversal application analyzer.

FIG. 7 depicts an example computer system with a transversal application analyzer. The computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, magnetic memory, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes a topology-based multivariate anomaly detector 711. The anomaly detector 711 scans slices of metrics measurements of an application component(s) in a transaction execution path to detect anomalies. The anomaly detector 711 constrains the search space at least based on the transaction execution path. So, metrics of components of a distributed application that are not active (i.e., not within the execution path) are not scanned. The search space can be further constrained with an anomaly model and/or canonical model to guide analysis of the metrics measurements slices. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for topology-based multivariate analysis of sets of application related metrics to detect anomalies for a distributed application as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
  determining an execution path for a transaction type of a distributed application, wherein the execution path indicates a plurality of components of the distributed application;
  based on the execution path, determining that a first component of the plurality of components is of a first component type indicated in a first model for anomaly detection, wherein the first model indicates the first component type, a first plurality of metrics of the first component type, and a behavior of the first plurality of metrics that has been correlated to a named application anomaly;
  based on determining that the first component is of the first component type indicated in the first model, scanning first time-series measurements of the first plurality of metrics collected from the first component, wherein scanning the first time-series measurements comprises, temporally reading the first time-series measurements, wherein collection of the first the time-series measurements is ongoing;
  based on reading t of the first time-series measurements, analyzing the t first time-series measurements to determine whether the t first time series measurements exhibit the behavior correlated to the named application anomaly, wherein t is a number of observations of the first plurality of metrics that can form the behavior, by evaluating the t first time-series measurements against a set of conditions that represent the behavior, wherein the set of conditions relate to at least one of changes in direction of multiple of the t first time-series measurements with respect to each other, rate of change of multiple of the t first time-series measurements with respect to each other, frequency of directional changes in multiple of the t first time-series measurements with respect to each other, and changes in multiple of the t first time-series measurements with respect to a condition independent of the t first time-series measurements; and
  based on a determination that t of the first time-series measurements exhibit the behavior correlated to the named application anomaly, generating an event indicating detection of an anomaly for the distributed application.

2. The method of claim 1, further comprising setting a scanner to scan the first time-series measurements of the first plurality of metrics of the first component.

3. The method of claim 2, wherein setting the scanner comprises configuring the scanner with an identifier of the first component and indications of the first plurality of metrics.

4. The method of claim 3 further comprising determining the identifier of the first component of the execution path.

5. The method of claim 1, wherein temporally reading the first time-series measurements of the first plurality of metrics of the first component comprises accessing a repository that comprises measurements of a second plurality of metrics across the distributed application, wherein the first plurality of metrics is a subset of the second plurality of metrics.

6. The method of claim 1, wherein analyzing the t first time-series measurements to determine whether the t first time-series measurements exhibit the behavior correlated to the named application anomaly comprises determining whether the t first time-series measurements fit a set of one or more functions that represent the behavior.

7. The method of claim 1, wherein analyzing the t first time-series measurements to determine whether the t first time-series measurements exhibit the behavior correlated to the named application anomaly comprises:
  generating first multivariate analysis covariance values from the t first time-series measurements; and
  determining variance between the first multivariate analysis covariance values and second multivariate analysis covariance values indicated in the first anomaly model as representing the behavior.

8. One or more non-transitory machine-readable media having program code for topology-based feature selection to detect anomalies in a distributed application, the program code comprising instructions to:
  determine an execution path for a distributed application, wherein the execution path indicates a plurality of components of the distributed application;
  based on the execution path, determine which component or components of the plurality of components is of a component type indicated in an anomaly model, wherein the anomaly model indicates a component type, a plurality of blame metrics for the component type, and a behavior of the plurality of blame metrics;
  for each component determined to be of a component type indicated in the anomaly model, scan time-series measurements of the plurality of blame metrics indicated in the anomaly model that have been collected for the component, wherein the instructions to scan the time-series measurements comprise instructions to,
  read the time-series measurements, wherein collection of the time-series measurements is ongoing;
  based on reading t of the time-series measurements, analyze the t time-series measurements to determine whether the t time series measurements exhibit the behavior indicated in the anomaly model, wherein t is a number of observations of the plurality of blame metrics that can form the behavior, by evaluating the t first time-series measurements against a set of conditions that represent the behavior, wherein the set of conditions relate to at least one of changes in direction of multiple of the t first time-series measurements with respect to each other, rate of change of multiple of the t first time-series measurements with respect to each other, frequency of directional changes in multiple of the t first time-series measurements with respect to each other, and changes in multiple of the t first time-series measurements with respect to a condition independent of the t first time-series measurements; and based on a determination that t of the time-series measurements exhibit the behavior, generate an event indicating detection of an anomaly for the distributed application.

9. The non-transitory machine-readable media of claim 8, wherein the anomaly model indicates an anomaly name that has been correlated to the behavior indicated in the anomaly model, wherein the instructions to generate the event comprise instructions to generate the event with the anomaly name.

10. The non-transitory machine-readable media of claim 8, wherein the program code further comprises instructions to instantiate scanner code to scan the time-series measurements of the plurality of blame metrics of a component, wherein the scanner code comprises the instructions to scan.

11. The non-transitory machine-readable media of claim 10, wherein the instructions to instantiate the scanner code to scan the time-series measurements of the plurality of blame metrics of a component comprises instructions to instantiate the scanner code with arguments comprising an identifier of the component and indications of the plurality of blame metrics.

12. The non-transitory machine-readable media of claim 11, wherein the program code further comprises instructions to determine the identifier of the component of the execution path.

13. The non-transitory machine-readable media of claim 8, wherein the instructions to read the time-series measurements of the plurality of blame metrics of a component comprise instructions to access a repository that comprises measurements of a plurality of metrics across the distributed application, wherein the plurality of blame metrics is a subset of the plurality of metrics.

14. The non-transitory machine-readable media of claim 8, wherein the instructions to analyze the t time-series measurements to determine whether the t time-series measurements exhibit the behavior comprise instructions to determine whether the t time-series measurements fit a set of one or more functions that represent the behavior.

15. The non-transitory machine-readable media of claim 8, wherein the instructions to analyze the t time-series measurements to determine whether the t time-series measurements exhibit the behavior indicated in the anomaly model comprise instructions to:

generate first multivariate analysis covariance values from the t time-series measurements; and determine variance between the first multivariate analysis covariance values and second multivariate analysis covariance values indicated in the anomaly model as representing the behavior.

16. An apparatus comprising:
a processor;
a network interface; and
a machine-readable medium having program code stored thereon, the program code executable by the processor to cause the apparatus to:

determine an execution path for a distributed application, wherein the execution path indicates a plurality of components of the distributed application;

based on the execution path, determine which component or components of the plurality of components is of a component type indicated in each of a plurality of anomaly models, wherein each anomaly model indicates a component type, a plurality of blame metrics for the component type, and a behavior of the plurality of blame metrics; and for each component determined to be of a component type indicated in at least one of the plurality of anomaly models, scan time-series measurements of the plurality of blame metrics indicated in the anomaly model that have been collected for the component, wherein the instructions to scan the time-series measurements comprise instructions to:

temporally read, via the network interface, the time-series measurements, wherein collection of the time-series measurements is ongoing, based on reading t of the time-series measurements, analyze the t time-series measurements to determine whether the t time series measurements exhibit the behavior indicated in the anomaly model, wherein t is a number of observations of the plurality of blame metrics that can form the behavior, by generating first multivariate analysis covariance values from the t time-series measurements and determining variance between the first multivariate analysis covariance values and second multivariate analysis covariance values indicated in the anomaly model as representing the behavior, and based on a determination that t of the time-series measurements exhibit the behavior, generate an event indicating detection of an anomaly for the distributed application.

17. The apparatus of claim 16, wherein each of the plurality of anomaly models indicates an anomaly name that has been correlated to the behavior indicated in the anomaly model, wherein the instructions to generate the event comprise instructions to generate the event with an anomaly name.

18. The apparatus of claim 16, wherein the instructions to analyze the t time-series measurements to determine whether the t time-series measurements exhibit the behavior comprise instructions to determine whether the t time-series measurements fit a set of one or more functions that represent the behavior.

* * * * *